United States Patent [19]

Hadden

[11] Patent Number: 4,751,808
[45] Date of Patent: Jun. 21, 1988

[54] COMBINED STRIPPER AND SEALING APPARATUS FOR BAG FORMING AND METHOD

[75] Inventor: William A. Hadden, Atlanta, Ga.

[73] Assignee: Kliklok Corporation, Atlanta, Ga.

[21] Appl. No.: 36,079

[22] Filed: Apr. 9, 1987

[51] Int. Cl.⁴ .......................... B65B 9/08; B65B 9/10
[52] U.S. Cl. ...................................... 53/451; 53/551; 53/373
[58] Field of Search .................... 53/551, 552, 66, 75, 53/373

[56] References Cited

U.S. PATENT DOCUMENTS

| | | | |
|---|---|---|---|
| 3,027,695 | 4/1962 | Leasure | 53/451 |
| 3,256,673 | 6/1966 | Tew et al. | 53/551 |
| 3,616,087 | 10/1971 | Henry et al. | |
| 3,668,815 | 6/1972 | Henry et al. | 53/451 X |
| 3,685,250 | 8/1972 | Henry et al. | 53/551 |
| 4,291,520 | 9/1981 | Prince et al. | 53/551 |
| 4,404,863 | 1/1985 | James | |
| 4,495,748 | 9/1983 | Rowell | |
| 4,537,012 | 8/1985 | Groom et al. | 53/552 |

Primary Examiner—Horace M. Culver
Attorney, Agent, or Firm—King and Schickli

[57] ABSTRACT

A combined stripper and bag sealing apparatus for use in a form, fill and seal packaging machine includes a pair of sealing jaws operated in reciprocating fashion to close and seal a package film tube. A pair of stripper plates are mounted on the sealing jaws for movement into and out of contact with the packaging film tube to strip any product from the area of the package film tube to be sealed prior to sealing by the sealing jaws. The sealing jaws are mounted on a carriage for limited oscillating movement in the longitudinal direction of the package film tube to perform the stripping and sealing functions. The stripper/plates sealing jaws are sequentially moved by one or more crank assemblies having drive links connected to the sealing jaws. Each crank assembly is actuated by means of opposed pneumatic operating cylinders functioning in concert to move and positively stop and accurately position the stripper plates/sealing jaws. A control circuit efficiently operates the apparatus and allows easy programming and precise adjustment to allow formation of any size bag to maximize packaging speed and with a minimum of sealing jaw and carriage movement.

16 Claims, 4 Drawing Sheets

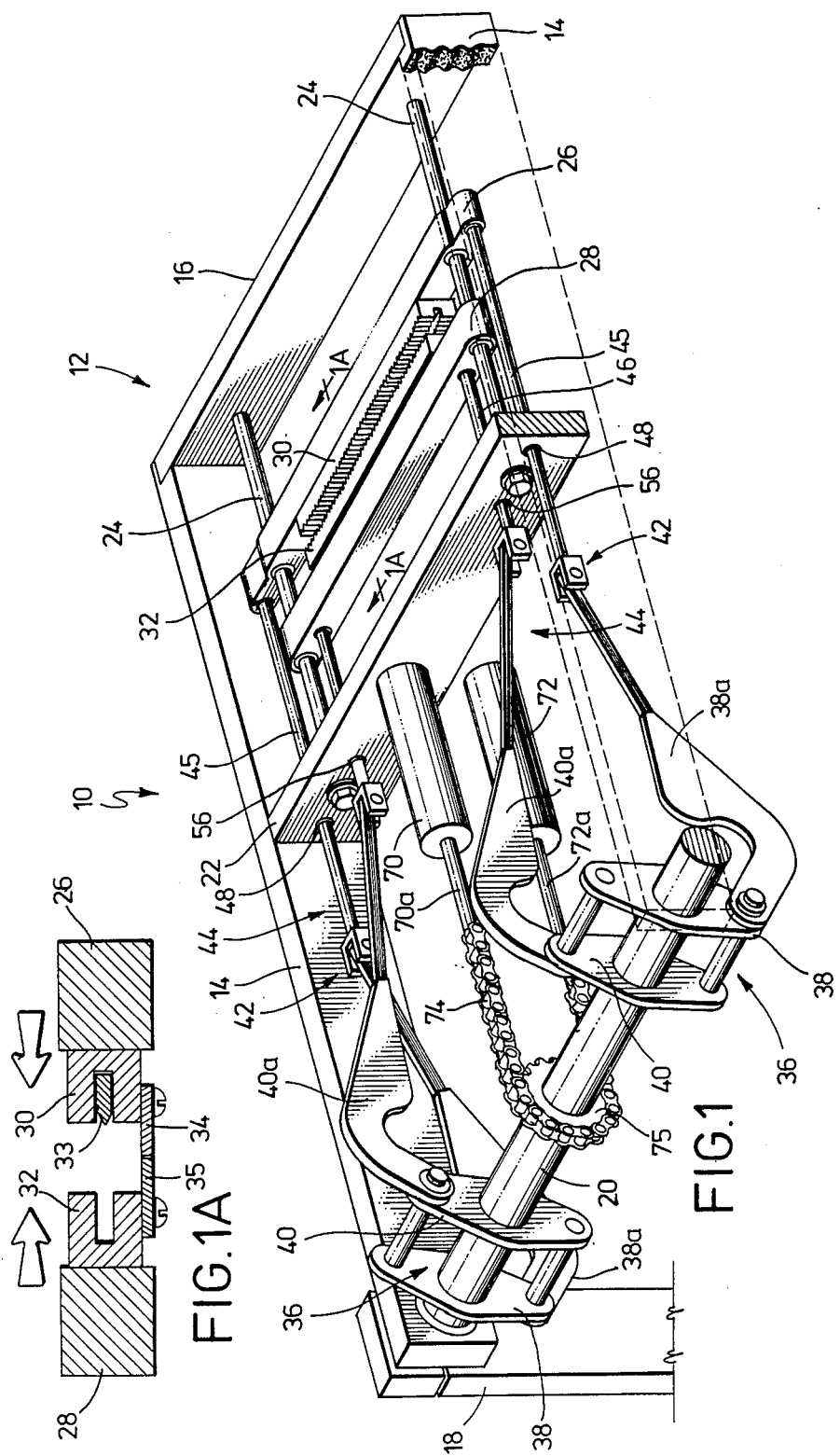

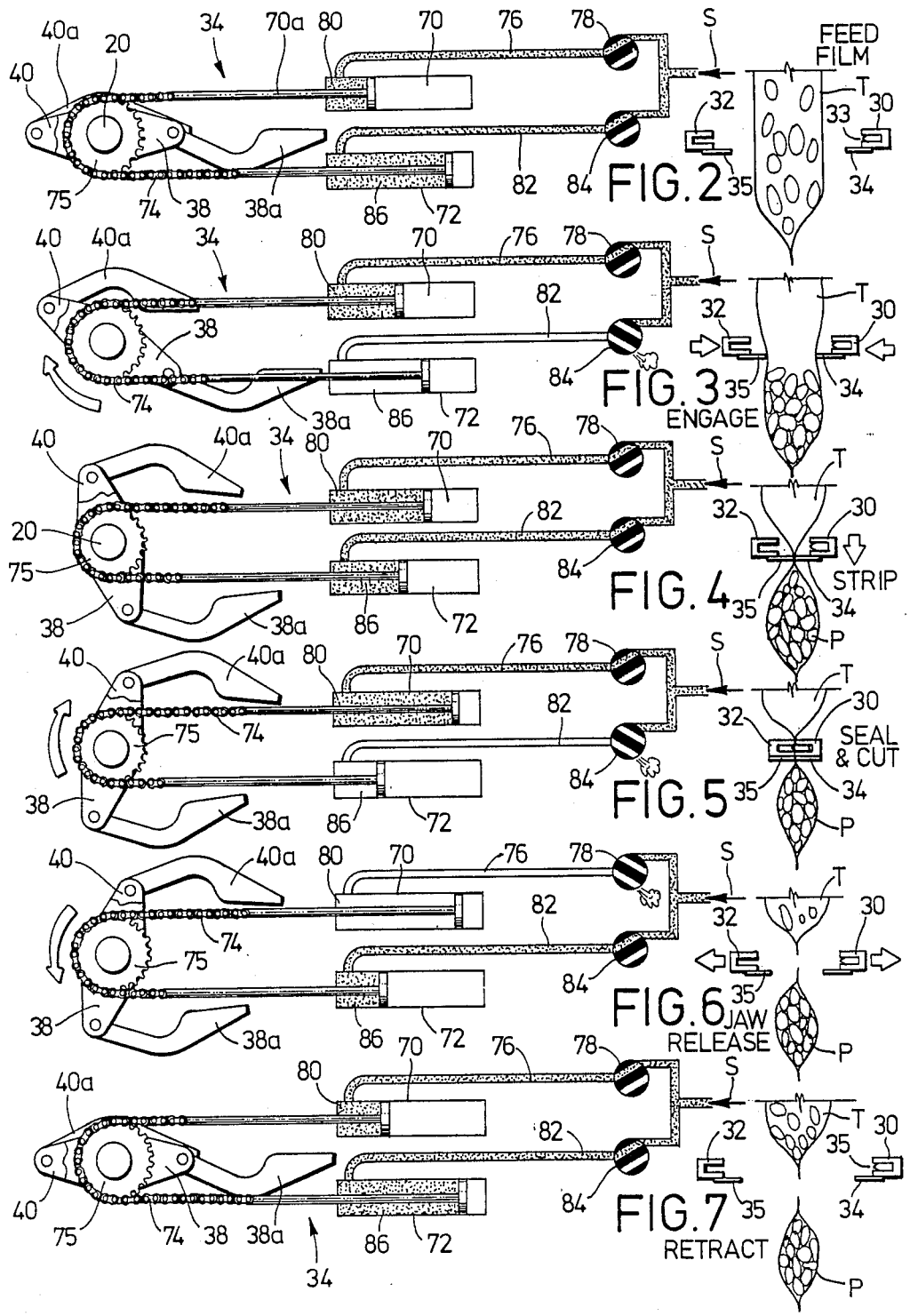

COMBINED STRIPPER AND SEALING APPARATUS FOR BAG FORMING AND METHOD

BACKGROUND OF THE INVENTION

The present invention relates to the field of form, fill and seal packaging systems, and more particularly, to an improved product stripper and bag sealing operation that may be adjusted for handling different size bags for maximum packaging speed.

Machines and related methods for forming, filling and sealing of packages made from a continuous film are well known in the art. These machines typically comprise a supply of packaging film, a former for converting the film into a continuous hollow tube and reciprocating jaws on a movable carriage for stripping, sealing and cutting the tube into a consecutive series of filled packages, namely pillow-shaped bags.

The sealing jaws in a typical packaging machine of this type are brought together in two steps. The first step closes the jaws just sufficiently to bring the stripper plates into engagement to flatten the package film tube. The stripper plates are moved relative to the film tube in order to strip any product from the zone of the tube to be subsequently sealed. The second step completes the closing of the bag by bringing the sealing jaws together to form the seal and to cut the bag from the tube.

After each bag is formed, the jaws are typically moved outwardly from the film tube by a fixed distance and moved relative to the tube back to the home position in readiness for producing the next bag from the continuous film tube.

In one known form of the machine and method according to form, fill and seal packaging principles, the sealing jaws are mounted on a carriage that is reciprocated in a longitudinal direction with respect to the film tube to both strip and feed the film. The carriage slides along vertical support rods and the machine control moves the sealing jaws in and out with respect to the tube in order to form the package. During the last portion of the movement of the carriage, the sealing jaws are in the sealing position clamping the film tube and the motion is operative to feed the next bag length. The bag length is actually determined by a photocell sensor reading registration marks on the film with the sealing jaws opening to release the film before reaching the full travel. In this manner, the length of the bag is controllable within a relatively narrow range.

This type of stripper and sealing apparatus has proven highly successful in practice and a large number of machines of this type are in operation today. One of the most successful machines of this type is shown and claimed in the prior U.S. patent entitled Sealing Carriage, U.S. Pat. No. 3,616,087, issued Oct. 26, 1981 and assigned to the same assignee as the present invention. Even with the substantial success of this type of prior machine and method, demands have been made on the industry for substantially increased speed and efficiency. In response to this demand, I have invented a new system for feeding the packaging film, which system is disclosed and claimed in my prior U.S. patent application entitled Packaging Film Feeding Apparatus and Method, Ser. No. 941,694, filed Dec. 15, 1986, and assigned to the same assignee as the present invention, now U.S. Pat. No. 4,727,707, issued Mar. 1, 1988. This new film feeding concept employs endless belts that engage the sides of the film that are driven by stepping motors and controlled by computer. The feeding of the film is maximized in terms of speed and efficiency by constantly accelerating the film over the first half of the driving time and constantly decelerating the film over the remaining half. This feature, along with others provides substantial increases in the efficiency and speed of the packaging operation and is expected to obtain wide acceptance among the industry.

In order to obtain the maximum film feeding efficiency and speed in accordance with my prior invention set forth in the previously filed application, it has been found necessary to also increase the efficiency and speed of the stripping and sealing operation. In the prior devices, such as shown in the prior U.S. Pat. No. 3,616,087, the sealing jaws are moved substantially the same distance during each packaging cycle, both along the longitudinal axis of the film as well as toward and away from the film in order to seal each individual bag. As a result, even with improved film feeding as set forth in my previous invention, the complete packaging machine cannot operate at full efficiency because the slower, old style sealing jaw movement is a limiting factor.

In addition to the need for increased efficiency and speed in order to match my new film feeding concept, there is a need to provide a stripper and sealing jaw apparatus that can be adjusted or programmed to operate on a broad range of bag sizes. A breakthrough in technology of this nature allows providing a standard carriage for the sealing jaws for minimum cost to the manufacturer while assuring that the stripper/sealing jaw operation can match the increased film feeding speed for any size bag.

SUMMARY OF THE INVENTION

Accordingly, it is the first object of the present invention to provide a stripper and sealing jaw system and related method that has improved efficiency and speed in order to overcome the difficulties of the prior art and to match the increased speed of state-of-the-art film feeding technology.

It is another object of the present invention to provide an apparatus and method for stripping and sealing continuous film to form a package that is adaptable to a broad range of bag sizes without changing the carriage or any other parts of the machine.

It is another object of the present invention to provide an apparatus and method for stripping/sealing that minimizes carriage and sealing jaw movement for increased speed.

It is still another object of the present invention to provide a new packaging system that provides for precise control of the strippers/sealing jaws in order to minimize the operation time for any given size bag being formed.

It is still another object of the present invention to provide a stripping and sealing concept for form, fill and seal machines that allows operation with a minimum amount of compressed air.

It is still another object of the present invention to provide a stripper/sealing apparatus and method that utilizes positive pneumatic pressure in opposed cylinders to provide positive and precise positioning and control of strippers and sealing jaws on the sealing carriage.

Additional objects, advantages and other novel features of the invention will be set forth in part in the description that follows and in part will become apparent to those skilled in the art upon examination of the following description, or may be learned with the practice of the invention. The objects and advantages of the invention may be realized and attained by means of the instrumentalities and combinations particularly pointed out in the appended claims.

Thus, to achieve the foregoing and other objects, and in accordance with the purposes of the present invention now known and as described herein, an improved apparatus is provided for operating on a continuous film tube for forming a succession of bags with maximum efficiency and speed. In particular, the efficiency is such as to match the increased efficiency described in my prior patent application, Ser. No. 941,694, for film feeding. The present invention takes advantage of specifically programming the movement of the sealing jaws to match each bag size being formed, as will become clear in the discussion below.

Broadly speaking, my present invention is a combined stripper and bag sealing apparatus for packaging product in a bag formed from a continuous film tube including a carriage, means for driving the carriage along the tube and sealing jaw means that are mounted on the carriage for movement between closed and open positions at the proper and controlled times. In addition to precise and efficient control of the sealing jaw means, the stripping means is similarly controlled. The sealing jaw means is moved in a first direction toward the closed position for stripping and sealing and moved in a second direction toward the open position to release the formed bag. Fluid operating means, preferably in the form of opposed pneumatic cylinders, are utilized for this movement and advantageously also are used for stopping movement of the sealing jaw means in a positive manner. Control means, preferably in the form of a programmable index controller is provided for controlling the pressure to the pneumatic cylinders; whereby both the stripping means and sealing jaw means are operated in a precise manner to both move and stop according to bag size to maximize packaging machine speed.

The control in this manner of the sealing jaw means allows the manufacturer of the machine to incorporate a standard carriage to serve the desired broad range of bag sizes and still maximize speed of the stripper/sealing operation to match the state-of-the-art film feeding operation. Advantageously, there are no mechanical parts involved in changing the operation of the machine to change the bag size, but instead this is accomplished by simply reprogramming the controller. Once a particular bag size has information inputed into the controller, that bag size can be automatically recalled and the machine switch-over time is virtually eliminated.

In accordance with more specific features of the present invention that further add to the efficiency and speed of operation, there is provided a unique crank assembly and drive linkage for moving the strippers/sealing jaws in a first direction toward the closed position for stripping and sealing, and then in a second direction toward the open position to release the formed bag. There are preferably two crank assemblies in the preferred embodiment illustrated, and each includes a pair of bell cranks operating the linkage. The linkage, itself, comprises a pair of drive arms and drive rods connected to the two sealing jaws.

In order to oscillate the crank assemblies, a drive shaft is provided and includes a central drive sprocket. A chain looped 180° around the drive sprocket drives the shaft in response to movement of the pair of pneumatic cylinders. The piston rods of the cylinders connect to the chain and operate in opposition to each other to move and positively stop the motion of the sealing jaws..

Also in the preferred embodiment, the carriage upon which the sealing jaws are mounted, is provided with oscillating motion. The carriage is separately pivoted on the drive shaft and moves the sealing jaws longitudinally along the film tube only by the amount required for stripping. Since the movement is limited, the momentum that needs to be overcome at the end of each stripping stroke is minimized. This is substantially less than the momentum previously generated in a carriage movement that provides stripping, as well as feeding of the packaging film. In the present preferred embodiment, as well as in my prior application, the packaging film feeding is by endless belts engaging the film tube above the carriage.

A pair of valves are connected between the pneumatic pressure source and the operating cylinders in order to pressurize and vent the cylinders to atmosphere in the proper sequence. For example, in order to move the sealing jaws in the first direction toward the closed position, one side of the piston in the first cylinder is pressurized and the other cylinder is exhausted to atmosphere. This causes the chain to rotate the sprocket and drive shaft and move the sealing jaws as desired. Then, when the sealing jaws reach the position for stripping, that is in the position where the stripper plates engage and fully flatten the film tube, the valve associated with the exhausted cylinder is switched to feed pressure against its piston thereby bringing the sealing jaws to an immediate and precise stop. Since the pressure is balanced on the two cylinders, there is no over-travel and minimal mechanical parts are involved, the stripping operation can begin instantly thereby preventing any lost time in the cycle.

The sealing and cutting functions are performed by simply exhausting the second cylinder and allowing the pneumatic pressure in the first cylinder to bring the sealing jaws fully together and then cut the sealed area of the finished bag. Next, the second cylinder is pressurized with the first cylinder being exhausted to release the jaws from the sealing position. The extent of movement of the jaws in the second direction outward away from the film tube is carefully controlled by applying pneumatic pressure to the first cylinder at the selected time and position. In accordance with the invention, the spacing between the jaws is limited to provide clearance for the particular bag being formed and no more. This in turn further increases the speed of operation.

The heart of the control circuit of the present invention is a programmable index controller operative to control the pneumatic valves in the precise manner required. The controller also is operative to start and stop the stepping motors for the endless belt film feeders in a manner that is fully coordinated with the movement of the sealing jaws. The index controller is synchronized with the master controller of the machine, which in turn is operative to provide the carriage drive.

Still other objects and advantageous results of the present invention will become readily apparent to those skilled in the art from the following more detailed description. I have shown and described a preferred embodiment of this invention, simply by illustrating one of the modes best suited to carry out the objectives. As will be realized, the invention is capable of other different embodiments, and its several details are capable of modifications in various, obvious aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together, with the description serve to explain the primary principles of the invention. In the drawings:

FIG. 1 is a perspective view of the combined stripper and bag sealing apparatus of the present invention with parts broken away and shown in phantom for clarity;

FIG. 1A is a cross-sectional view taken along line 1A—1A in FIG. 1 and illustrating the sealing jaws and attached stripper plates;

FIGS. 2-7 are schematic illustrations of the operating cylinders and attached linkage for moving the sealing jaws, and with the sealing jaws and the film tube shown in the corresponding position;

Figure 8:
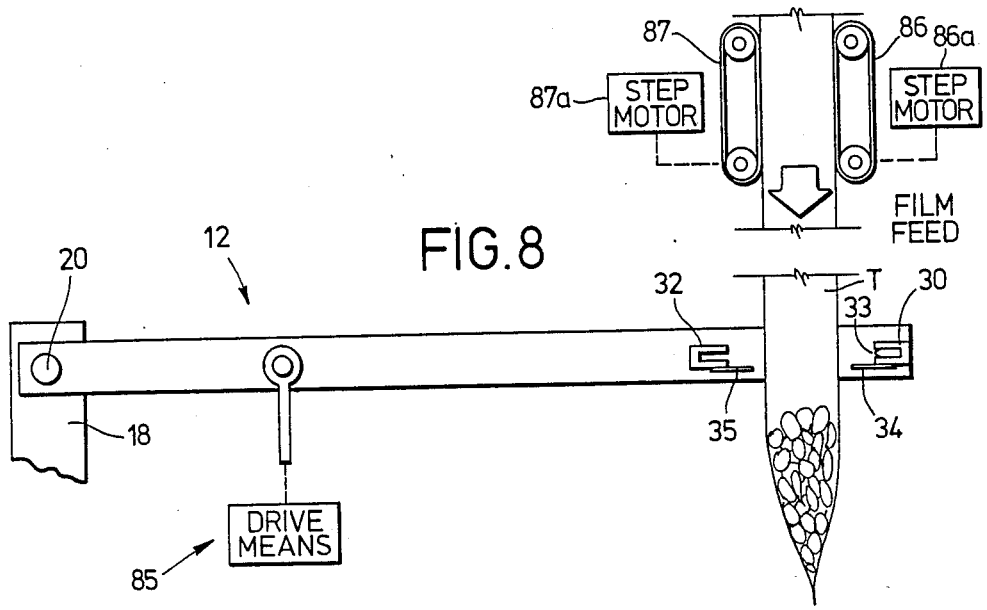
FIGS. 8-12 are also sequential showings of the sealing jaws and film tube, but with the carriage mounting the sealing jaws and with the drive means for the carriage shown schematically.

Reference will now be made in detail to the present preferred embodiment of the invention, an example of which is illustrated in these drawings.

DETAILED DESCRIPTION OF THE INVENTION

Reference is now made to the perspective view of FIG. 1 showing an improved combined stripper and bag sealing apparatus 10 of the invention. A carriage 12 includes a pair of side rails 14 and a front cross rail 16. A support frame 18 (one shown in FIG. 1) forms a part of the packaging machine and receives an oscillating drive shaft 20. As will be seen in detail below, the carriage 12 oscillates up and down as viewed in FIG. 1 as it pivots about the shaft 20. In order to allow the oscillating motion of the shaft 20 as well as the oscillating movement of the carriage 12 to occur at the same time, it is clear that the shaft 20, is journalled for rotation in the support frame 18 and the carriage 12 is journalled for separate rotation.

At the forward end of the carriage 12 fixedly positioned between the front cross rail 16 and intermediate cross piece 22 are mounted two guide rods 24. Supported for sliding motion along the guide rods 24 are a pair of support blocks 26, 28 that carry sealing jaws 30, 32. As best shown in FIG. 1A, one of the sealing jaws 30 includes a cutoff knife 33 operable in a known fashion to cut and release each formed bag in the proper timed sequence. Mounted below the two sealing jaws are slidable stripper plates 34, 35. These plates are spring loaded to their extended position in a manner well-known in the art. In the position shown in FIG. 1A, the plates are in a position to fully engage the film tube (not shown) and strip the product from the seal area prior to the final movement of the sealing jaws 30, 32 together for sealing.

Mounted on the oscillating drive shaft 20 are a pair of bell crank assemblies 36. Each of the assemblies includes two bell cranks 38, 40 and pivotally attached to each of the bell cranks is a corresponding drive arm 38a, 40a. Attached to each of the outside drive arms 38a is a drive linkage, generally designated by the reference numeral 42. Similarly, attached to each of the inside drive arms 40a is a drive linkage 44. The drive linkages 42, 44 are operative to move the sealing jaw support blocks 26, 28 toward and away from each other to perform the stripping/sealing operation.

Specifically, the outer drive linkages 42 include a drive rod 45 and the inner drive linkages 44 include a drive rod 46. The drive rods 45 slideably pass through slide apertures 48, in the cross piece 22, and are fixedly attached to the support block 26 to provide the necessary movement. Similarly, inside drive rod 46 forming a part of the drive linkage 44 passes through slide opening 56 and is fixedly attached to the support block 28.

In accordance with an important aspect of the present invention, the oscillating drive shaft 20 is driven by a pair of pneumatic operating cylinders 70, 72. The corresponding piston rods 70a, 72a are attached to the opposite ends of drive chain 74 that is looped 180° around drive sprocket 75 fixedly attached to the shaft 20. Advantageously, the two operating cylinders 70, 72 act in concert with each other to provide the desired movement of chain 74 to turn the sprocket 75. The shaft 20 in turn oscillates, moving the crank assemblies 36 which through the arms 38a, 40a and drive linkages 42, 44 move the sealing jaws 30, 32 toward and away from each other.

Before proceeding with a more detailed discussion of the specific operation, it is readily apparent that a new and improved combined stripper and bag sealing apparatus for use in packaging product in a bag in a form, fill and seal packaging machine is provided. In broad terms, the sealing jaws 30, 32 are mounted on the carriage 12 for selective movement in a first direction toward the closed position for stripping and sealing (see FIG. 1A) and in a second direction toward the open position to release the formed bag. The first operating cylinder 70 is operative by pneumatic pressure to move the sealing jaws 30, 32 in this first direction, but in addition the second operating cylinder when pressurized, as will be seen more in detail later, is operative to stop the movement in a positive manner at a predetermined location of the sealing jaws 30, 32. Similarly, when the second operating cylinder 72 is operative to move the sealing jaws 30, 32 in the second direction, that is away from each other to the open position, the first operating cylinder 70 is capable of stopping the movement once the predetermined position is reached. With this positive control, the sealing jaws move only so far as necessary determined by the bag size being run on the machine at any particular time. Because of this, the speed of the machine is maximized and further the amount of compressed air needed by the cylinders 70, 72 is a minimum.

Proceeding now to review in detail the operation of the combined stripping and bag forming apparatus 10 and related method of the present invention, reference should first be made to FIGS. 2-7. These figures are schematic illustrations of the side view of stripper/sealing apparatus 10 with parts removed for clarity and with the operating cylinders 70, 72 and a portion of the pneumatic circuit shown schematically. Thus, in FIG. 2, the right side crank assembly 36 is shown with crank 38 (outside position and broken away) and crank 40 (inside position and partially shown) attached to respective drive arms 38a, 40a. The piston rod 70a is shown extended to substantially full extension positioning the inside crank 40 in the full retracted position. This means that the sealing jaw 32 is substantially fully retracted away from film tube T (see right side of FIG. 2). Conversely, with the outside crank 38 in the opposite 180° position, the arm 38a is fully extended meaning that sealing jaw 30 is also fully retracted, or pushed away from film tube T (also see right side of FIG. 2).

In order to position the cylinders 70, 72 in this position, pneumatic pressure from pressure source S is supplied to the pneumatic circuit. First, pressure to feed line 76 through the two-way valve 78 thus pressurizes the operative chamber 80 of the cylinder 70. As shown in FIG. 2, the pressurization is denoted by the dotted space. Similarly, pneumatic pressure from the source S is provided in the feed line 82 through another two-way valve 84 and provides pressurization of the corresponding opposing chamber 86 in the cylinder 72. It is significant to note in FIG. 2 of the drawings that both chambers 80, 86 are pressurized which has the desired effect of positively stopping and holding the sealing jaws 30, 32 at the desired position. Thus, the position of the sealing jaws 30, 32 can be accurately repeated during each packaging cycle and can, in fact, be selected in order to provide just the right opening for the size bag being formed by the film tube T.

FIG. 3 represents the next step in the operation, that is bringing the sealing jaws 30, 32 in the first direction toward the closed position and with the stripping plates 34, 35 engaging the sides of the tube T. The feed line 76 and operating chamber 80 remains pressurized, whereas the opposing chamber 86 of the cylinder 72 is vented to atmosphere by operation of the valve 84.

Moving to FIG. 4, once the exact stripping position is reached, the sealing jaws 30, 32 are brought to a positive stop by simply switching the valve 84 back to provide pressurization of the line 82 and the chamber 86. With this arrangement of opposed pneumatic pressure, there is a desired cushioning effect as the jaws 30, 32 come to a halt, but at the same time the stopping action is precise and accurate. The exact positioning is selected by the operator of the machine by simply properly timing the shifting of the valve 84 to the pressurized position (FIG. 4). Once the jaws 30, 32 are in this position, the carriage 12 is moved downwardly to strip the product, as shown by the action arrow in this figure.

Moving now to FIG. 5, the valve 84 is once again moved to the exhaust position allowing the built up pressure in chamber 86 to be released. This allows the pressure in the chamber 80 of the first operating cylinder 70 to move the sealing jaws 30, 32 all the way to the closed position for sealing and cutting and actual forming of package or bag P. Of course, as the sealing jaws 30, 32 fully close, the stripping plates 34, 35 simply move against their spring mounting to accomodate the closing.

In FIG. 6, the valve 84 to the second cylinder 72 is switched to the pressure side and valve 78 is switched to exhaust. This allows chamber 86 to be pressurized in order to retract or move the jaws 30, 32 in the second direction and release the bag P. In FIG. 7, with the valve 84 remaining in the pressurize position, the valve 78 is operated to once again pressurize the chamber 80 so as to stop, by opposed pressure, the movement at precisely the required time.

The stopping of the sealing jaws 30, 32 as described without requiring full opening is an important aspect of the present invention since substantial time during the packaging cycle is saved. For a small bag the jaws 30, 32 open only a small amount, whereas for larger bags the jaws 30, 32 can retract by the larger space required for clearance.

In FIG. 7, the finished bag P drops fully away and the next packaging cycle is ready to begin. The same positioning is shown in FIG. 2 except that the carriage 12 has returned to its upper or home position and the next length of film tube T is fed into position.

FIGS. 8–12 are presented to provide a look at the bag stripping and sealing operation and method of the present invention in conjunction with the movement of the carriage 12.

As seen in FIG. 8, a drive means generally designated by the referenced numeral 85, is provided for oscillating the carriage 12 about the shaft 20 carried by the support frame 18 of the machine. In this figure, the sealing jaws 30, 32 are withdrawn to the desired position to allow the film tube T to pass through by feeding from endless belts 86, 87 driven by corresponding stepping motors 86a, 87a. For an additional description of the manner in which the belts 86, 87 are driven, reference is made to my co-pending application Ser. No. 941,694, referenced above. FIG. 8 of the drawings corresponds generally to the showing in FIG. 2, discussed above.

Figure 9:
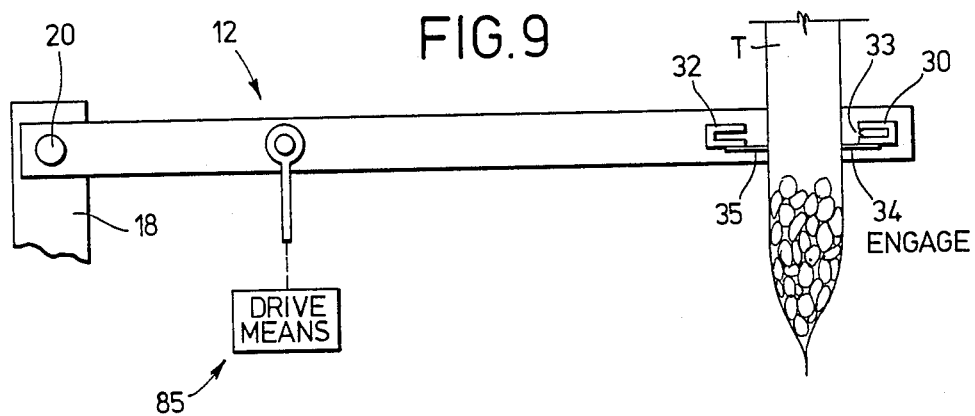

FIG. 9 shows the sealing jaws 30, 32 moving into position to engage the film tube T and with the drive means 85 still not activated so that the carriage 12 remains in the upper or home position. This showing corresponds generally to the similar showing in FIG. 3 above.

Figure 10:
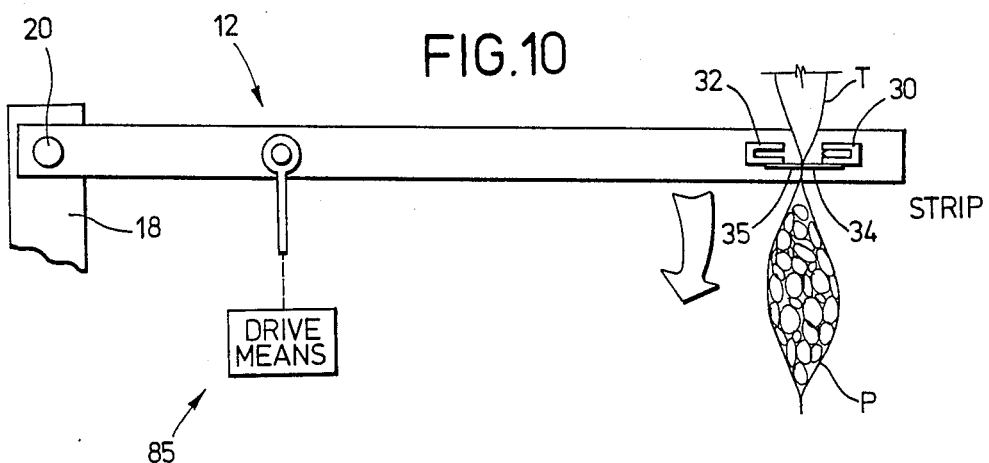

FIG. 10 illustrates the position of the sealing jaws 30, 32 where the stripper plates 34, 35 are brought into full engagement to strip the product down into the bag P. The drive means 85 is now activated as shown by the action arrow. This showing corresponds to FIG. 4.

Figure 11:
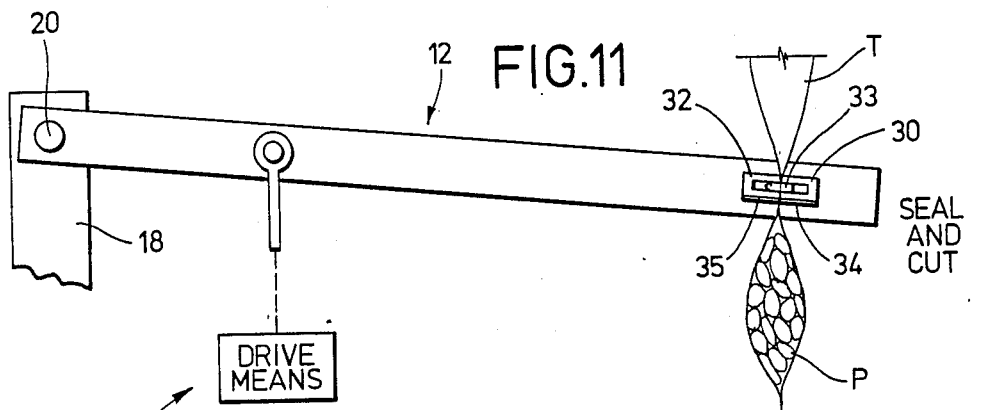

In FIG. 11, the stripping is complete and the sealing jaws 30, 32 are fully closed for sealing and cutting. The drive means 85 has moved the carriage 12 to its lowermost position. FIG. 11 corresponds to FIG. 5.

Figure 12:
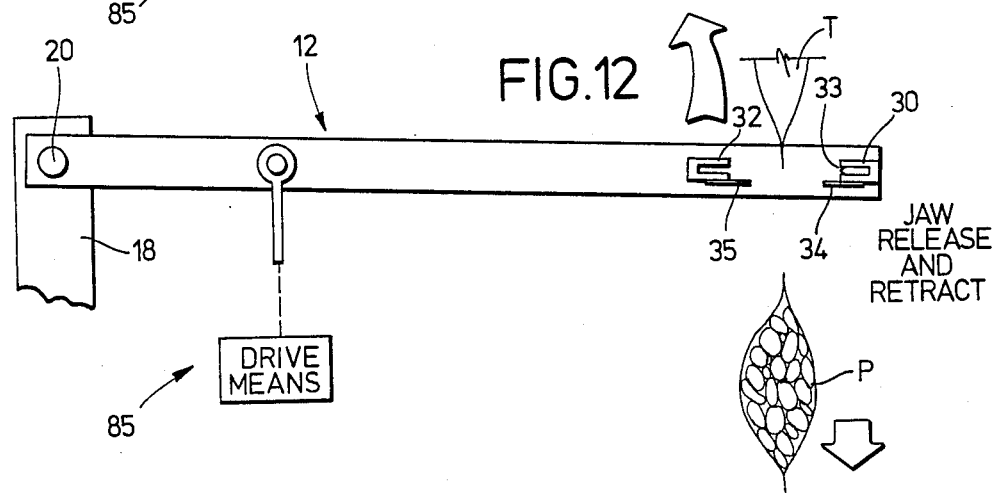

In FIG. 12, the bag P is formed, cut and released, and the jaws 30, 32 return to their open position. Likewise, the drive means 85 moves the carriage 12 back to the home position in readiness for the next packaging cycle (see action arrow). This figure corresponds to combined FIGS. 6 and 7 described above.

Figure 13:
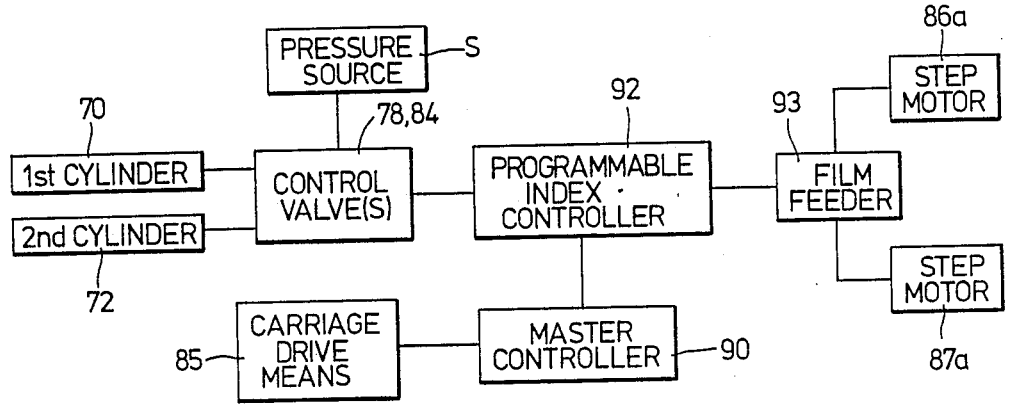
FIG. 13 is a schematic block diagram showing the control circuit of the stripper and bag sealing apparatus of the present invention.

With reference now to FIG. 13, the fluid control circuit is schematically illustrated and includes a master controller 90 for the packaging machine, which may be a conventional cam drive operated by a synchronous motor and in turn directly operates drive means 85 for the carriage 12. A programmable index controller 92 is synchronized with the master controller of the machine and is operative to drive the film feeder 93 which includes the stepping motors 86a, 87a. By properly setting the programmable index controller 92 any length bag may be generated from the continuous film tube T. The starting and stopping point for feeding the tube is selected to optimize the machine speed.

In a similar manner, the programmable index controller operates the control valves 78, 84 to control first cylinder 70 and second cylinder 72, respectively. As described above, the control valves 78, 84 pressurize the operating chambers 80, 86 respectively from the pressure source S in a manner to ensure not only rapid and efficient movement of the sealing jaws 30, 32 but also substantially instantaneous and precise stopping of the jaws.

In summary, the results and advantages of this invention should now be clear to one skilled in the art. The stripper/sealing apparatus 10 is operable in a manner to uniquely handle a broad range of bag sizes on a standard carriage. The sealing jaws 30, 32 which carry the stripper plates 34, 35 are moved in a precise manner by first and second pneumatic cylinders 70, 72. Advantageously, the cylinders 70, 72 are utilized not only to move the jaws but also to precisely stop the jaws during the opening and closing movements according to the bag size being run to maximize the packaging machine speed. With this apparatus and the related method, the operation is sufficiently rapid to take full advantage of the improved film feeding operation of my co-pending application Ser. No. 941,694, discussed above. Through use of the programmable index controller 92, the parameters for any size bag can be entered into the memory and then recalled when that size bag is to be run. The film feeder 93 is also controlled by the programmable index controller 92 so as to initiate and stop the feeding of the film tube T at the optimum points. This control action serves to determine the actual length of the bag P being formed.

The foregoing description of a preferred embodiment of the invention has been presented for purposes of illustration and description. It is not intended to be exhaustive or to limit the invention to the precise form disclosed. Obviously, modifications or variations are possible in light of above teachings. For example, rather than using a pneumatic control circuit and pneumatic cylinders 70, 72, a hydraulic circuit can be utilized to provide increased preciseness of operation where desired. Also, a single four-way valve can be utilized in place of the two two-way valves 78, 84 in either a pneumatic or hydraulic circuit. In addition, simple on-off valves can be positioned in the lines 76, 82 in order to limit the volume of the respective chambers. These valves are then operated in response to movement of the sealing jaws 30, 32 to stop the movement at two of the critical points in the cycle. Specifically, the on-off valve in the line 76 is closed to immediately pressurize the chamber 80 when the jaws 30, 32 are fully open or retracted; whereas the on-off valve in line 82 is operative to immediately pressurize the chamber 86 and stop the movement of the jaws 30, 32 at the stripping position. These two modes of operation correspond generally to the modes shown in FIGS. 7 and 4 of the drawings, respectively.

The preferred embodiment chosen and described provides the best illustration of the principles of the invention and its practical application to thereby enable one of ordinary skill in the art to utilize the invention in various embodiments and with various modifications as are suited to the particular use contemplated. It is intended that the scope of the invention be defined by the claims appended hereto.

I claim:

1. A combined stripper and bag sealing apparatus for use in packaging product in a bag formed from a continuous film tube in a form, fill and seal packaging machine, comprising:
    a carriage;
    means for driving said carriage in a longitudinal direction along said tube;
    sealing jaw means mounted on said carriage for movement between closed and open positions;
    stripping means on said sealing jaw means for stripping the product prior to sealing;
    means mounted on said carriage and connected to said sealing jaw means for selectively moving said sealing jaw means in a first direction toward the closed position for stripping and sealing and moving said sealing jaw means in a second direction toward the open position to release the formed bag;
    first fluid operating means connected to said moving means for operating said sealing jaw means in the first direction and stopping movement in a positive and efficient manner in the second direction at a predetermined position;
    second fluid operating means connected to said moving means for operating said sealing jaw means in the second direction and stopping movement in a positive and efficient manner in the first direction at a predetermined position; and
    control means for said operating means programmable according to the bag size being packaged;
    whereby said stripping means and sealing jaw means are operated in a precise manner to both move and stop according to bag size to maximize packaging machine speed.

2. The combined stripper and the bag sealing apparatus of claim 1, wherein said means for selectively moving said sealing jaw means comprises;
    crank means mounted for oscillating movement on said carriage; and
    drive linkage connecting said crank means to said sealing jaws to provide the movement alternately in the first and second directions.

3. The combined stripper and bag sealing apparatus of claim 2 wherein said crank means comprises a dual bell crank assembly; and
    said drive linkage includes a drive arm and connecting drive rod for each sealing jaw;
    said drive rod mounted for reciprocating movement so as to move the sealing jaw in the first and second direction in response to movement of said crank assembly.

4. The combined stripper and bag sealing apparatus of claim 3 wherein said moving means further comprises:
    an oscillating drive shaft connected to said bell crank assembly;
    sprocket means mounted on said drive shaft; and
    a drive chain positioned around the drive sprocket for movement back and forth in response to said first and second fluid operating means.

5. The combined stripper and bag sealing apparatus of claim 4 wherein said first and second fluid operating means comprises:
    first and second fluid operating cylinders.

6. The combined stripper and bag sealing apparatus of claim 4 wherein said carriage is mounted on said drive shaft for separate oscillating movement in response to said carriage driving means.

7. The combined stripper and bag sealing apparatus of claim 4 wherein said first and second fluid operating means comprises:
    first and second fluid operating cylinders;
    said operating cylinders including piston rods connected to said drive chain for movement back and forth to provide oscillating motion to said drive shaft.

8. The combined stripper and bag sealing apparatus of claim 1 wherein said first and second fluid operating means comprises first and second operating cylinders;
    fluid pressure means for feeding said cylinders; and valve means for selectively connecting said pressure means to said cylinders to operate said sealing jaw means in said first and second directions and stopping movement in a positive manner in predetermined positions;

whereby movement of the stripping means and sealing jaw means may be precisely controlled for different bag sizes.

9. The combined stripper and sealing apparatus of claim 8 wherein said valve means is operative in response to said control means to provide pressurized fluid to opposed sides of said cylinders in order to provide the positive stopping action for precise control.

10. The combined stripper and sealing apparatus of claim 9 wherein said valve means comprises a pair of two-way valves for feeding pressurized fluid to said cylinders;

said two-way valves being operative to alternately feed pressurized fluid to opposite sides of the respective cylinders to provide the precise control of the sealing jaw movement.

11. The combined stripper and bag sealing apparatus of claim 1 wherein said control means includes a programmable index controller to provide precise adjustment for the bag size being packaged.

12. The combined stripper and bag sealing apparatus of claim 11 wherein as further provided stepping motor means for driving said film in order to form the bag;

said programmable index controller being connected to said stepping motor to properly time the film to further maximize the packaging machine speed.

13. The method of stripping and sealing of a bag to be filled with product and formed from a continuous film tube in a form, fill and seal packaging operation comprising the steps of:

feeding a length of film corresponding to the bag length between a pair of sealing jaws and strippers;
moving said sealing jaws by first and second opposed fluid cylinders by simultaneously filling said first cylinder and evacuating said second cylinder in a first direction toward the closed position to engage the strippers on opposite sides of the film;
stopping the movement of said sealing jaws in the stripping position by applying pressure to both said first and second cylinders and moving said sealing jaws in the longitudinal direction with respect to the film tube to provide the stripping action;
continuing to move said sealing jaws in the first direction to the closed position for sealing and forming said bag;
cutting the bag to allow release;
moving said sealing jaws in a second direction by simultaneously evacuating said first cylinder and filling said second cylinder toward the open position to release the formed bag; and
stopping said movement of the sealing jaws by applying pressure to both said cylinders prior to reaching full travel in accordance with the bag size being formed;
whereby the strippers and sealing jaws are operated in a precise manner to move and stop according to bag size to maximize the speed of the packaging operation.

14. The method of stripping and bag sealing recited in claim 13 wherein the step of feeding the film is precisely controlled according to the bag size being packaged in the packaging operation.

15. The stripping and bag sealing method of claim 14 wherein the control of the position of the strippers and sealing jaws and the feeding of the film is in response to a programmable index controller;

the step of feeding of the film including driving of the film by a stepping motor responsive to the controller.

16. The combined stripper and bag sealing apparatus of claim 1, wherein said second fluid operating means is connected to said moving means in opposition to first fluid operating means.

* * * * *